No. 842,501. PATENTED JAN. 29, 1907.
A. J. SCHOENECKE.
WINDOW PLANT BOX.
APPLICATION FILED SEPT. 29, 1906.

Witnesses:
Geo. E. Gaylord.
Chas. H. Buell.

Inventor:
August J. Schoenecke.

ID_NUM_START
UNITED STATES PATENT OFFICE.

AUGUST J. SCHOENECKE, OF CHICAGO, ILLINOIS.

WINDOW PLANT-BOX.

No. 842,501.  Specification of Letters Patent.  Patented Jan. 29, 1907.

Application filed September 29, 1906. Serial No. 336,750.

*To all whom it may concern:*

Be it known that I, AUGUST J. SCHOENECKE, a citizen of the United States, residing at 3519 Southwestern Boulevard, in the county of Cook and State of Illinois, have invented a new and useful Improvement in Window Plant-Boxes, of which the following is a specification.

My invention relates to an improvement in the construction of boxes for growing plants or flowers which are adapted to fit on the inner sills or outer ledges of windows; and it relates particularly to an improvement in boxes in the class referred to which are constructed to render them self-watering to the roots of the plants growing in the soil they contain.

Figure 1:
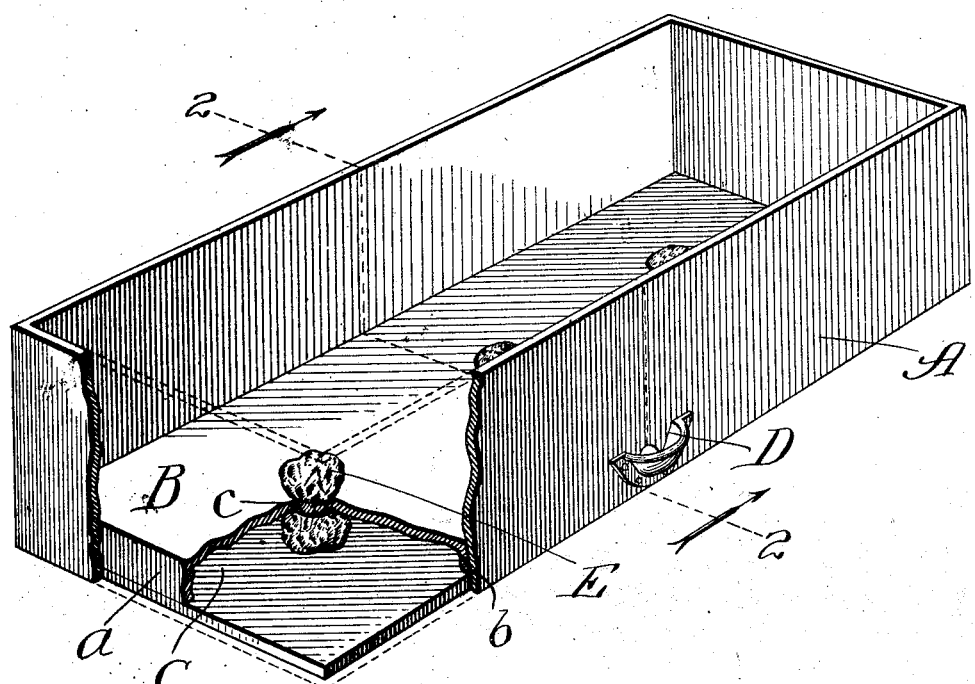
Figure 2:
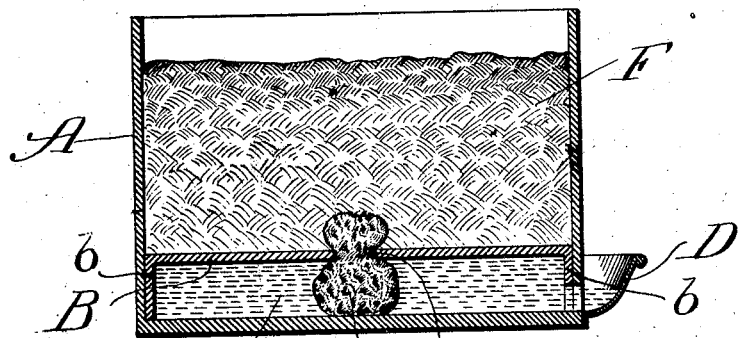

In the accompanying drawings, Figure 1 is a broken perspective view of a window plant-box of my improved construction, and Fig. 2 a section taken at the line 2 2 on Fig. 1 viewed in the direction of the arrows and showing soil in the box.

A is a box, which may be formed of sheet metal or other suitable material and of proper shape to adapt it to fit the inner sill or outer ledge of a window. As shown, it is of oblong rectangular shape. Within the box is contained a false bottom B, provided with depending end flanges *a* and side flanges *b*, at which the false bottom, which snugly fits inside the box A, bears on the inner surface of the bottom of the latter and forms the interposed water-reservoir C, with which communicates, through a flange *b*, a filling-spout D, secured on a side of the box and extending to or short of the level of the false bottom. At intervals in the false bottom B, preferably along its center, are provided holes *c*, each hole confining at its neck portion a sponge E, expanded into a head above the false bottom and into a similar head within the reservoir C.

With the reservoir supplied with water in which the lower ends of the sponges are immersed and the upper ends of the sponges embedded in soil F in the box upon the false bottom and bedding the roots of growing plants or flowers (not shown) the latter are automatically watered by the capillary action of the sponges or other suitable capillary medium in drawing water from the reservoir and transferring it to the soil, from which the roots take their supply.

The false bottom B is rendered by my improved construction readily removable for cleaning the box when desired and to adapt it to be easily replaced by a new false bottom. The false bottom being preferably formed of sheet metal is liable to wear out, as from rusting, and by rendering it thus removable it may be readily replaced by a new one as often as required at small expense, while the box proper, even though made of sheet metal, will outlast several of such false bottoms.

What I claim as new, and desire to secure by Letters Patent, is—

1. A window flower-box comprising, in combination, a box proper provided with a removable false bottom of sheet metal having depending flanges and containing holes, said bottom fitting within the box proper to space it, by its flanges, from the inner surface of the box proper bottom and form a water-reservoir, sponges confined in said holes to project above the false bottom and below the same into the reservoir, and a filling-spout on said box discharging into the reservoir.

2. A window flower-box comprising, in combination, a box proper provided with a removable false bottom of sheet metal containing holes and having depending flanges extending entirely about it, said bottom fitting within the box proper to space it, by its flanges, from the inner surface of the box proper bottom and form a water-reservoir, sponges confined in said holes to project above the false bottom and below the same into said reservoir, and a filling-spout on said box discharging into the reservoir and extending upward on the outer side of the box approximately to the plane of said false bottom.

AUGUST J. SCHOENECKE

In presence of—
W. B. DAVIES,
J. H. LANDES.